3,410,885
STABILIZED METHYL ARSINE OXIDE COMPOSITION

Arthur Schwerdle, Vineland, N.J., assignor to Vineland Chemical Company, Vineland, N.J., a partnership
No Drawing. Filed Mar. 3, 1966, Ser. No. 531,347
8 Claims. (Cl. 260—440)

The present invention relates to the stabilization of methyl arsine oxide; and, more particularly it relates to a novel aqueous composition of matter containing methyl arsine oxide wherein the methyl arsine oxide is stabilized against degradation upon standing and to a method for so stablizing methyl arsine oxide.

Methyl arsine oxide is a compound having fungicidal properties. It is marketed as an aqueous solution which is then further diluted with water for application by spraying. It has been found, however, that aqueous solutions of methyl arsine oxide are unstable in that, upon standing, the content of methyl arsine oxide therein decreases with time. The mechanism of the degradation of the methyl arsine oxide is not precisely known, but I believe it to involve a combination of two things: oxidation of the methyl arsine oxide to methyl arsonic acid, and (b) decomposition of the methyl arsine oxide to arsenic trioxide ($As_2O_3$) or arsenious acid in solution. Since aqueous solutions of methyl arsonic acid are stable, I do not believe the mechanism to involve first oxidation of methyl arsine oxide to methyl arsonic acid with the latter degrading to arsenic trioxide.

Degradation of methyl arsine oxide in aqueous solution presents obvious problems since containers thereof may stand for considerable lengths of time between manufacture and ultimate use.

It is the principal object of the present invention to provide aqueous solutions of methyl arsine oxide which are stabilized against degradation.

Other objects, including the provision of a method for stabilizing methyl arsine oxide in aqueous solution, will become apparent from a consideration of the following specification and claims.

The novel stabilized composition of the present invention comprises an aqueous solution of methyl arsine oxide containing therein a stabilizing amount of an hydroxy aromatic compound selected from the group consisting of benzenes and naphthalenes having at least one hydroxyl group attached directly to a ring carbon atom thereof.

As will appear from the examples and data hereinafter set forth, the compositions of the present invention are of vastly improved stability as compared to simple aqueous solutions of methyl arsine oxide but without the hydroxy aromatic compound. I do not believe the mechanism of stabilization can be explained simply on the basis of reducing oxidation, since degradation of methyl arsine oxide to arsenic trioxide is prevented. The data will show that this route of degradation is protected to at least as great an extent (and in many cases to a greater extent) as that involving oxidation of the methyl arsine oxide to methyl arsonic acid.

The hydroxy aromatic compounds found suitable for stabilizing methyl arsine oxide in aqueous solution, according to the present invention, are those compounds containing a benzene or naphthalene nucleus and having at least one hydroxyl group attached to a ring carbon atom. In the preferred embodiment, at least two hydroxyl groups are attached to ring carbon atoms of the aromatic compound. Generally, no more than three hydroxyl groups are so attached. The dihydroxy and trihydroxy benzenes have been found to be particularly suitable. As will appear from the examples hereinafter set forth, the aromatic nucleus may, in addition to the hydroxyl group or groups, have attached thereto other groups which, insofar as the present invention is concerned, are inert. Such additional groups include alkyl groups, carboxyl groups, carbalkoxy groups and the like. In general, there will usually be no more than one such additional group attached to the aromatic nucleus, and the size of such additional group is limited only by solubility characteristics imparted thereby in that the size of the group should not render the solubility of the compound in the aqueous solution insufficient for stabilization. Examples of suitable compounds are the mono-, di- and trihydroxy benzenes, such as phenol, cresol, hydroquinone (para-dihydroxybenzene), pyrocatechol (1, 2-hydroxybenzene), pyrogallol (1,2,3 - trihydroxybenzene), gallic acid (3,4,5-trihydroxy benzoic acid), n-propyl gallate, and the mono- and di-hydroxy naphthalenes, like 2,3-naphthalene diol. Hydroquinone is the presently preferred stabilizing compound.

In the compositions of the present invention, the concentration of the methyl arsine oxide in the aqueous solution will generally range from about 1% up to about 10%, by weight, based on the weight of the solution. In the preferred compositions, the concentration of methyl arsine oxide will be from about 2 to about 8%.

The amount of stabilizer compound may vary somewhat, but is generally based upon the amount of methyl arsine oxide in the composition. Thus, depending upon the particular stabilizer employed, the amount thereof may range from about 1% up to about 10%, by weight, based on the weight of the methyl arsine oxide, and preferably from about 2% to about 5%.

Obviously, some of the stabilizing compounds will not be soluble to the extent to provide, in solution, the maximum proportion thereof (based on the methyl arsine oxide) at the maximum concentrations of methyl arsine oxide. Hence, the upper limit of concentration of the stabilizing compound in any particular case may well depend upon its own solubility characteristics. If it is desired to dissolve more stabilizing compound in the aqueous solution beyond that which is normally soluble, a common coupling or solubilizing agent, such as an alcohol, may be employed.

The present invention will be more readily understood from a consideration of the following examples which are given for the purpose of illustration only and are not intended to limit the scope of the invention in any way.

Example 1

Crystalline methyl arsine oxide (99.6% purity) is dissolved in water to a concentration of 5%. To a portion of this solution is added hydroquinone to a concentration of 0.1% by weight (2% by weight, based on the weight of the methyl arsine oxide). The solution containing the hydroquinone and the control solution without the hydroquinone are placed in separate bottles and capped. The sealed bottles are stored for about 19 months after which they are opened and assayed for methyl arsine oxide. The assay involves the standard iodometric titration with iodine to a blue color end point. Since this titration involves oxidation of the methyl arsine oxide present to methyl arsonic acid as well as oxidation of the arsenic trioxide present to arsenic pentoxide, in order to determine the amount of methyl arsine oxide present, the arsenic pentoxide is precipitated as the magnesium ammonium salt, filtered off, reduced and again titrated.

The sample stabilized with hydroquinone shows that 0.78% of the methyl arsine oxide is lost during the 19 month period, and the solution without the hydroquinone shows a 10.1% loss of methyl arsine oxide.

Examples 2–7

Crystalline methyl arsine oxide (99.6% purity) is dissolved in tap water to a concentration of 1%. To aliquot portions are added the following stabilizing compounds in the indicated amounts in terms of percent by weight, based on the weight of the methyl arsine oxide:

| Example | Stablizing Compound | Amount, Percent |
|---|---|---|
| 2 | Hydroquinone | 2 |
| 3 | Pyrogallol | 4 |
| 4 | Pyrocatechol | 4 |
| 5 | Phenol | 5 |
| 6 | n-Propyl gallate | 4 |
| 7 | Gallic acid | 4 |

Each solution, as well as a control containing no stabilizing compound, is held in an open glass container in a position protected from direct sunlight during the day. At various times, as noted in the following table, the container of each solution is assayed to determine the percent of methyl arsine oxide lost to methyl arsonic acid and arsenic trioxide ($As_2O_3$), respectively:

TABLE

| Time (Days) | Control | | | 2 | | | 3 | | | 4 | | | 5 | | | 6 | | | 7 | | |
|---|---|---|---|---|---|---|---|---|---|---|---|---|---|---|---|---|---|---|---|---|---|
| | A[1] | O[2] | T[3] | A | O | T | A | O | T | A | O | T | A | O | T | A | O | T | A | O | T |
| 3 | 20.1 | 18.9 | 39.0 | | | | | | | | | | | | | | | | | | |
| 5 | | | | 2.9 | 0.0 | 2.9 | 0.0 | 0.0 | 0.0 | 0.0 | 0.0 | 0.0 | 7.0 | 0.0 | 7.0 | 0.8 | 0.0 | 0.8 | 0.4 | 0.0 | 0.4 |
| 10 | 23.6 | 18.1 | 41.7 | 13.2 | 0.3 | 13.5 | 0.0 | 0.0 | 0.0 | 0.0 | 0.0 | 0.0 | 11.3 | 4.4 | 15.7 | 2.9 | 0.0 | 2.9 | 3.4 | 0.0 | 3.4 |
| 20 | 29.3 | 22.8 | 52.1 | 9.1 | 4.4 | 13.5 | 0.0 | 0.1 | 0.1 | 5.5 | 0.1 | 5.6 | 6.7 | 22.3 | 2.1 | 0.1 | 2.2 | 3.9 | 0.1 | 4.0 |

[1] A = Percent loss to methyl arsonic acid.  [2] O = Percent loss to arsenious trioxide ($As_2O_3$).  [3] T = Total Percent loss.

Example 8

In this example, the same procedure as in Examples 2–7 is employed using, however, as the stabilizing compound p-cresol in an amount of 5%, by weight, based upon the weight of the methyl arsine oxide. The results are set forth in the following table:

| Time (Days) | Control | | | Example 8 | | |
|---|---|---|---|---|---|---|
| | A | O | T | A | O | T |
| 3 | 5.1 | 1.6 | 6.7 | 0.0 | 0.0 | 0.0 |
| 10 | 9.6 | 6.6 | 16.2 | 3.5 | 0.0 | 3.5 |
| 20 | 16.6 | 11.5 | 28.1 | 4.4 | 1.7 | 6.1 |

Example 9

The procedure of Examples 2–7 is followed except that the solution of methyl arsine oxide has a concentration thereof of 4.9%, and hydroquinone is used as the stabilizing compound in an amount of 2%, by weight, based on the weight of the methyl arsine oxide. The results are set forth below:

| Time (Days) | Control | | | Example 9 | | |
|---|---|---|---|---|---|---|
| | A | O | T | A | O | T |
| 3 | 12.4 | 11.1 | 23.5 | 0.0 | 0.0 | 0.0 |
| 10 | 14.7 | 8.3 | 23.0 | 1.3 | 0.0 | 1.3 |
| 20 | 27.4 | 17.0 | 44.4 | 3.5 | .3 | 3.8 |

Example 10

In this example, the procedure of Examples 2–7 is followed, using, however, 2,3-naphthalene diol as the stabilizing compound in an amount of 4%, by weight, based on the weight of the methyl arsine oxide. The results are as follows:

| Time (Days) | Control | | | Example 10 | | |
|---|---|---|---|---|---|---|
| | A | O | T | A | O | T |
| 3 | 9.0 | 1.5 | 10.5 | 2.0 | 0.0 | 2.0 |
| 10 | 11.6 | 10.0 | 21.6 | 2.0 | 1.5 | 3.5 |
| 15 | 13.5 | 7.7 | 21.2 | 7.2 | 1.9 | 9.1 |

Modification is possible in the selection of the stabilizing compound and in the amount thereof without departing from the scope of the invention.

I claim:

1. An aqueous composition of methyl arsine oxide stabilized against degradation comprising an aqueous solution of methyl arsine oxide containing dissolved therein a stabilizing amount of an hydroxy aromatic compound selected from the group consisting of benzenes and naphthalenes having at least one hydroxy group attached directly to a ring carbon atom.

2. The composition of claim 1 wherein the concentration of methyl arsine oxide is from about 1 to about 10%, by weight; and wherein the amount of hydroxy aromatic compound is from about 1 to about 10%, by weight, based on the weight of the methyl arsine oxide.

3. The composition of claim 1 wherein the concentration of methyl arsine oxide is from about 2 to about 8%, by weight; and wherein the amount of hydroxy aromatic compound is from about 2 to about 5%, by weight, based on the weight of the methyl arsine oxide.

4. The composition of claim 1 wherein the hydroxy aromatic compound is selected from the group consisting of phenol, cresol, hydroquinone, pyrocatechol, pyrogallol, gallic acid, n-propyl gallate and 2,3-naphthalene diol.

5. The composition of claim 4 wherein the concentration of methyl arsine oxide is from about 1 to about 10%, by weight; and wherein the amount of hydroxy aromatic compound is from about 1 to about 10%, by weight, based on the weight of the methyl arsine oxide.

6. The composition of claim 4 wherein the hydroxy aromatic compound is hydroquinone.

7. The composition of claim 4 wherein the concentration of methyl arsine oxide is from about 2 to about 8%, by weight; and wherein the amount of hydroxy aromatic compound is from about 2 to about 5%, by weight, based on the weight of the methyl arsine oxide.

8. The composition of claim 7 wherein the hydroxy aromatic compound is hydroquinone.

References Cited

UNITED STATES PATENTS

| 2,346,155 | 4/1944 | Denison et al. | 260—440 X |
| 2,312,207 | 2/1943 | Clayton et al. | 260—440 X |

FOREIGN PATENTS

| 21,072 | 10/1963 | Japan. |
| 492,078 | 4/1953 | Canada. |

TOBIAS E. LEVOW, *Primary Examiner.*

WERTEN F. W. BELLAMY, *Assistant Examiner.*